(12) United States Patent
Kuchta et al.

(10) Patent No.: US 6,208,505 B1
(45) Date of Patent: Mar. 27, 2001

(54) COMPUTER, KEYBOARD, AND FLAT SCREEN MONITOR SUPPORT ASSEMBLY

(75) Inventors: Richard Kuchta, Shickshinny, PA (US); Robert Vaida, Ellington, CT (US); Joseph Vivirto, South Windsor; Tim VanderVos, Vernon, both of CT (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/149,673

(22) Filed: Sep. 9, 1998

(51) Int. Cl.[7] .................................. G06F 1/16; H05K 5/02
(52) U.S. Cl. ...................... 361/683; 312/223.3; 248/918
(58) Field of Search ...................... 248/917, 919, 248/920, 921, 922, 923, 924, 918; 361/681, 683, 686, 724, 725; 312/223.1, 223.2, 223.3

(56) References Cited

U.S. PATENT DOCUMENTS

| | | | |
|---|---|---|---|
| 4,619,427 | * 10/1986 | Leymann | 248/178 |
| 4,638,969 | * 1/1987 | Brown | 248/122 |
| 4,687,167 | * 8/1987 | Shalka et al. | 248/282 |
| 4,880,270 | * 11/1989 | Cooper | 297/188 |
| 5,177,616 | * 1/1993 | Riday | 358/254 |
| 5,277,392 | * 1/1994 | Rossman et al. | 248/231.7 |
| 5,348,324 | * 9/1994 | Trotta | 280/35 |
| 5,621,612 | * 4/1997 | Dahmen | 361/683 |
| 5,758,849 | * 6/1998 | Bui | 248/125.1 |
| 5,769,369 | * 6/1998 | Meinel | 248/176.1 |
| 5,915,658 | * 6/1999 | Sheng | 248/346.06 |

* cited by examiner

*Primary Examiner*—Lynn D. Feild
(74) *Attorney, Agent, or Firm*—McCormick, Paulding & Huber LLP

(57) ABSTRACT

In a computer, keyboard, and flat-screen monitor support assembly a base is adapted to support a desktop-type computer housing thereon. A keyboard support tray pivotally is mounted to the base and extends outwardly therefrom. An upstanding support arm having a first end, and a second end, is attached to the base at one and to a flat-screen monitor at an opposite end. The opposite end of the support arm is spaced above the base to allow various differently sized computer housings to be positioned under the flat-screen monitor.

5 Claims, 1 Drawing Sheet

COMPUTER, KEYBOARD, AND FLAT SCREEN MONITOR SUPPORT ASSEMBLY

FIELD OF THE INVENTION

The present invention is generally directed to devices for supporting controllers on machinery, and deals more particularly with a mount for a desktop-type computer, wherein a flat-screen display is pivotally attached to a support arm sized to allow various different computer housings to be positioned thereunder without interfering with the display.

BACKGROUND OF THE INVENTION

With the miniaturization of electronic control components, control systems for operating machinery and production lines have become progressively smaller. This evolution has reached the point where controllers for very complex machinery are in the form of desktop-type computers mounted on or adjacent to the particular machine being operated by the controller.

Generally these computers include a display for viewing information pertaining to the work operation being performed by the machine. Historically, these displays have taken the form of cathode-ray-tube (CRT) type monitors which are usually positioned on top of, and supported by the computer housing. More recently, the CRT's have been increasingly replaced by flat-screen liquid crystal displays, which are lighter and occupy less space than the older more cumbersome CRT's. Usually these flat screen monitors are pivotally mounted on a stand which can be placed on a flat surface, or like the CRT's, on top of the desktop computer housing.

However, unlike the CRT's, the reduced weight and footprint of a stand mounted flat screen monitor makes the monitor somewhat less stable and prone to toppling. Moreover, when the controller incorporating such a monitor is mounted on a machine, it is subject to a more demanding environment where vibratory and impact loads are likely to be encountered. Accordingly, a problem occurs in that where a stand mounted flat-screen monitor is used in an industrial environment, it is possible that the monitor will topple and suffer damage.

Based on the foregoing, it is the general object of the present invention to provide an apparatus for supporting controllers incorporating flat screen monitors that overcomes the problems and drawbacks associated with prior art devices.

It is a more specific object of the present invention to provide a computer mount that supports the flat screen monitor which can also accommodate differently sized computer housings.

SUMMARY OF THE INVENTION

The present invention is directed to a computer, keyboard, and flat-screen monitor support assembly, that includes a base adapted to support a desktop-type computer housing. A keyboard support tray is pivotally mounted to the base and projects outwardly therefrom. An upstanding support arm is positioned approximately perpendicular to the base and defines a first end mounted thereto. A second end of the support arm is spaced above the base to allow a variety of differently sized desktop-type computer housings to be positioned thereunder. Means are provided to pivotally mount a flat screen monitor to the second end of the support arm, so that an operator can selectively adjust the angle at which the monitor is tilted relative to the base.

In the preferred embodiment of the present invention, the support arm is tubular defining a hollow interior area. In addition, an opening is defined by the support arm adjacent to the base to allow a power supply and associated wiring for operating the flat-screen monitor to be positioned in the interior area. A cover is releasably mounted over the opening, thereby concealing and protecting the power supply and wiring.

Preferably, a monitor mounting bracket adapted to support the flat-screen monitor is positioned in the interior area and attached to the support arm adjacent to its second end. The flat screen monitor is then pivotally attached to the monitor mounting bracket.

DETAILED DESCRIPTION OF THE PREFERRED EMBODIMENT

Figure 2:
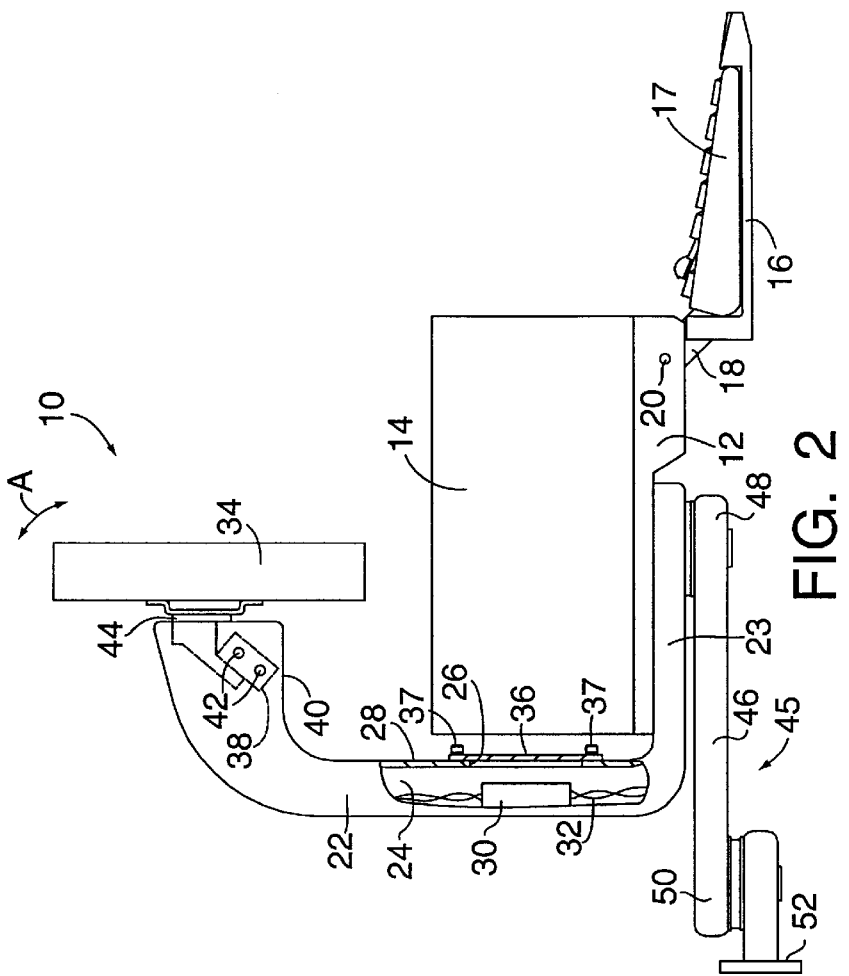
FIG. 2 is a partially cut away, side elevational view of the support assembly of FIG. 1.
Figure 1:
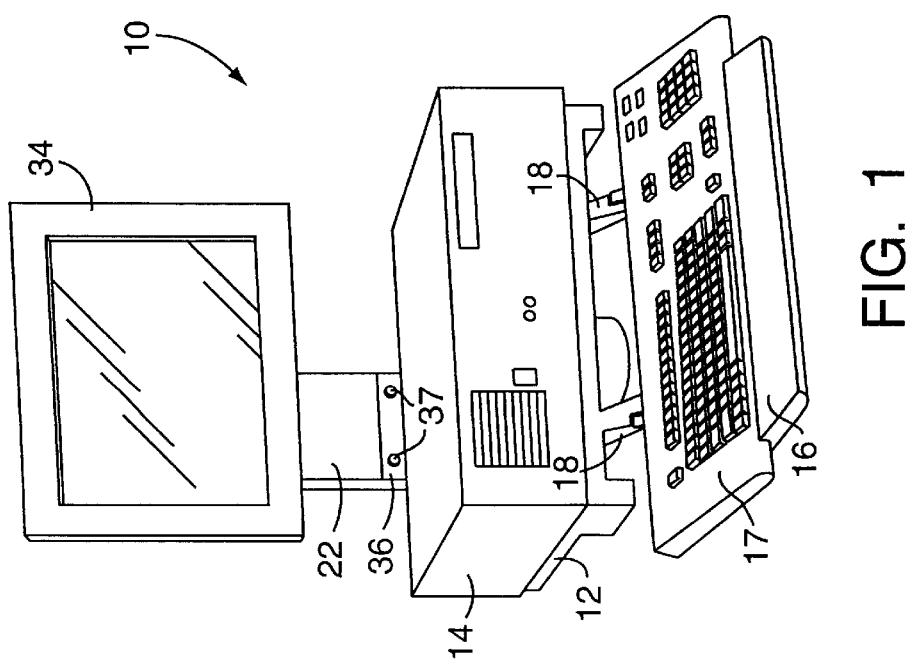
FIG. 1 is a perspective view of the support assembly of the present invention showing a computer, keyboard, and flat-screen monitor mounted thereon.

As shown in FIGS. 1 and 2, a computer, keyboard, and flat screen monitor support assembly 10 of the present invention includes a base 12 for supporting a desktop-type computer housing 14. The computer housing 14 may be secured to the base 12 in several different manners such as bolting it in place. However, a particularly effective manner of releasably securing the computer housing 14 to the base 12 is to employ hook-and-loop type fasteners (not shown) attached to the base and the computer housing. A keyboard support tray 16 having a computer keyboard 17 positioned thereon, extends outwardly from the base 12 and is mounted to allow rotation about a first generally horizontal axis to a pair of bosses 18 defined by the base, via a pair of fasteners 20, one of which is shown in FIG. 2.

Referring specifically to FIG. 2, an upstanding support arm 22 is attached at a first end 23 to the base 12. In the illustrated embodiment, the support arm 22 is positioned approximately centrally of, and perpendicular to the base 12. Preferably the support arm 22 is tubular and defines a hollow interior area 24 accessible via an opening 26 extending from an outer surface 28 of the support arm, into the interior area. The opening 26 allows a power supply 30 and associated wiring 32 for operating a flat-screen monitor 34 to be positioned in the interior area 24. A cover 36 is releasably attached to the support arm 22, via fasteners 37 to conceal and protect the power supply and wiring, 30 and 32 respectively.

Still referring to FIG. 2, a monitor mounting bracket 38, shown in dotted lines is located in the interior area 24 adjacent to a second end 40 of the support arm 22. The monitor mounting bracket 38 is releasably attached to the support arm 22 via fasteners 42. As shown in FIG. 2, the flat screen monitor 34 includes a bracket 44 pivotally attached thereto. The bracket 44 is in turn releasably mounted to the monitor mounting bracket 38, such that the flat screen monitor 34 can pivot about a second generally horizontal axis as denoted by the arrows labeled "A".

As shown in FIG. 2, the base 12 can be mounted on a swing arm assembly generally designated by the reference number 45. The swing arm assembly 45 includes a primary swing arm 46 rotatably attached to the base 12 at a first end 48 to allow rotation about a first generally vertical axis. The primary swing arm 46 is also rotatably attached at a second end 50 to a flange 52 to allow rotation about a second generally vertical axis which can be used to mount the entire assembly 10 to the frame of a machine, or to any other vertical member.

While preferred embodiments have been shown and described, various modifications and substitutions may be made without departing from the spirit and scope of the invention. Accordingly, it is to be understood that the present invention has been described by way of example, and not by limitation.

What is claimed is:

1. A computer, keyboard, and flat-screen monitor support assembly comprising:

a base adapted to support a desktop-type computer housing thereon;

a keyboard support tray pivotally mounted to said base and extending outwardly therefrom;

an upstanding support arm having a first end, and a second end, said support arm being approximately perpendicular to said base with said first end being attached thereto;

means for pivotally mounting a flat screen monitor to said second end of said support arm to allow an operator to selectively angle said flat screen monitor for comfortable viewing; and wherein said second end of said support arm is spaced above said base to allow any one of a plurality of differently sized computer housings to be positioned under said flat-screen monitor.

2. A computer, keyboard, and flat-screen monitor support assembly as defined by claim 1, wherein:

said upstanding support arm defines a hollow interior area and an opening adjacent to said first end and extending from an outer surface to said interior area, said opening and said hollow interior area being adapted to receive a power supply and associated wiring for providing electrical power to said flat-screen monitor; and wherein said computer mount further includes a cover releasably coupled to said upstanding support arm, over said opening for concealing and protecting said power supply and said associated wiring.

3. A computer, keyboard, and flat-screen monitor support assembly as defined by claim 1, further comprising:

a monitor mounting bracket releasably attached to said second end of said upstanding support; and wherein said flat screen monitor includes a bracket pivotally coupled thereto, and releasably attached to said monitor mounting bracket.

4. A computer, keyboard, and flat-screen monitor support assembly as defined by claim 1, further comprising:

a swing arm assembly including a primary swing arm having a first end rotatably coupled to said base, and a second end rotatably coupled to a flange, such that said flange can be employed to mount said computer, keyboard, and flat-screen monitor support assembly to an approximately vertical surface.

5. A computer, keyboard, and flat screen monitor support assembly as defined by claim 1, wherein the means for pivotally mounting a flat screen monitor to a second end of said support arm includes a bracket pivotally coupled at one end to said second end of said support arm and at an opposing end to a rear side of said flat screen monitor generally opposite the monitor screen.

* * * * *